United States Patent

[11] 3,545,577

[72] Inventor Anthony W. Harrison
    Birmingham, England
[21] Appl. No. 802,126
[22] Filed Feb. 25, 1969
[45] Patented Dec. 8, 1970
[73] Assignee Girling Limited
    Tyseley, Birmingham, England
[32] Priority March 2, 1968
[33] Great Britain
[31] No. 10242/68

[54] BLEEDING HYDRAULIC SYSTEMS
    3 Claims, 10 Drawing Figs.
[52] U.S. Cl. .................................................. 188/152
[51] Int. Cl. ................................................... B60t 11/30
[50] Field of Search ....................................... 188/152.14

[56] References Cited
    UNITED STATES PATENTS
    2,146,545  2/1939  Leighton ....................... 188/152(.14)
    3,216,194  11/1965 Yardley ......................... 188/152(.14)
    3,221,844  12/1965 Davis et al. ................... 188/152(.14)
    3,478,847  11/1969 Bender et al. ................. 188/106(P)

Primary Examiner—George E. A. Halvosa
Attorney—Scrivener, Parker, Scrivener and Clarke ABSTRACT: In a fixed caliper disk brake having independent pairs of operating cylinders for connection to dual circuits, each pair having a feed and bleed connection to one of the cylinders, and wherein the bleed outlet is below at least part of the working space of at least one of the cylinders, passage means at least part of which lies within the working space within the cylinder and communicating with the bleed outlet and port means connecting the substantially vertically highest region of the working space above the bleed with the passage means.

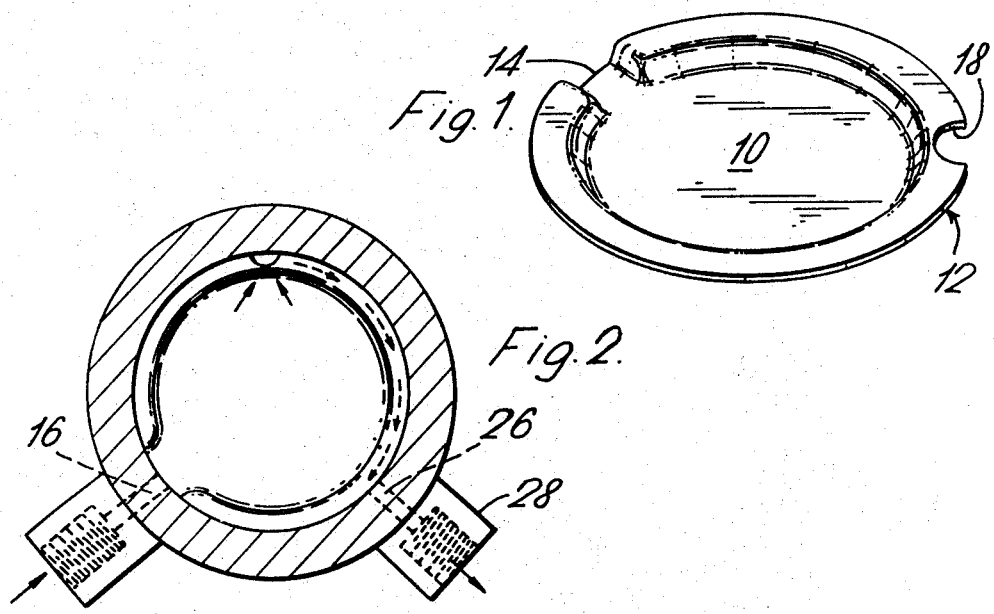
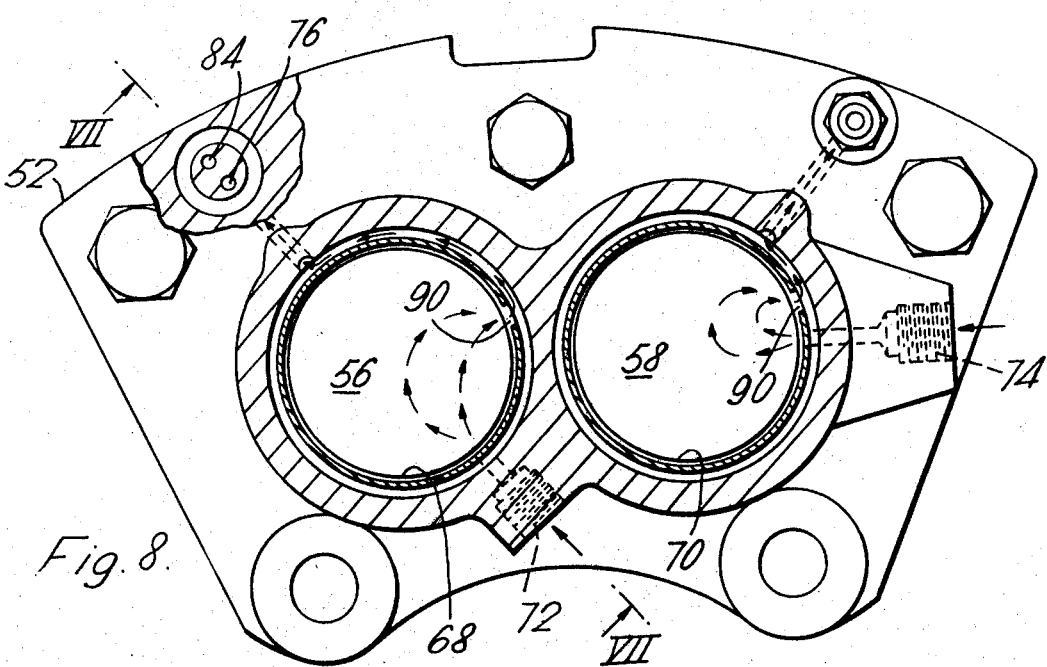

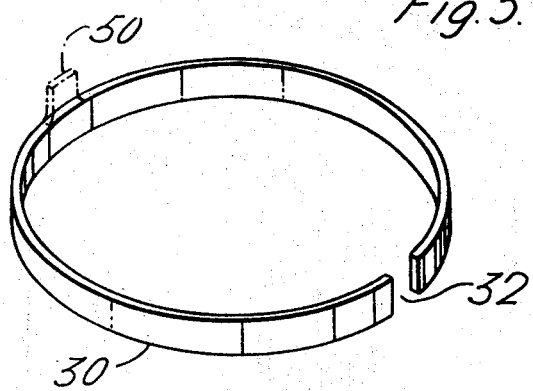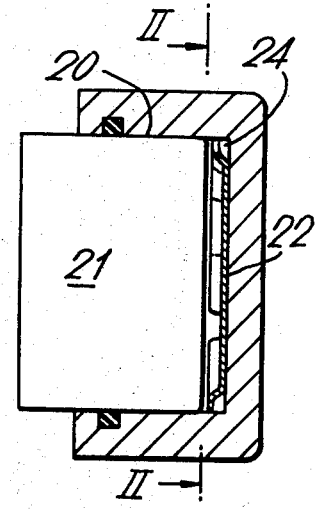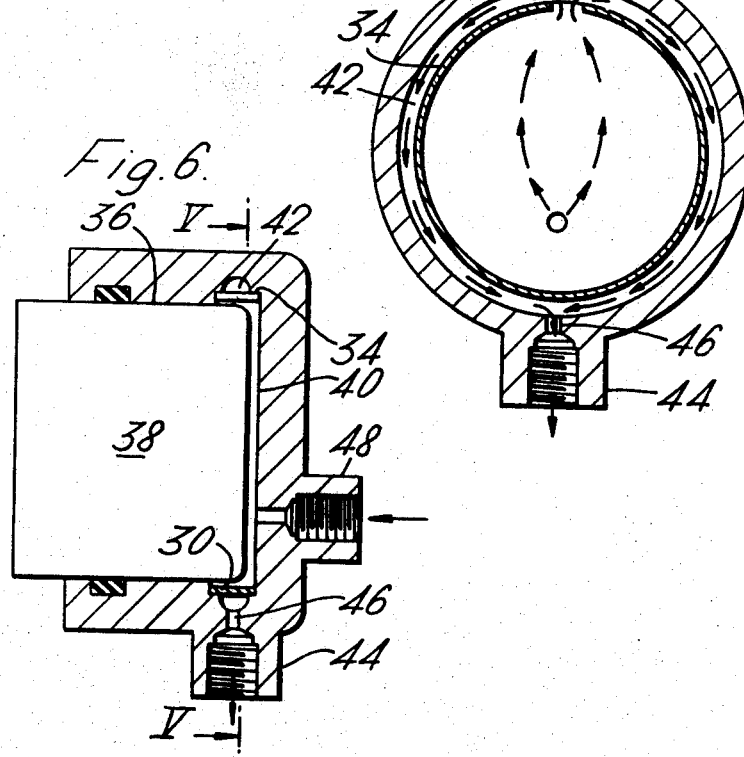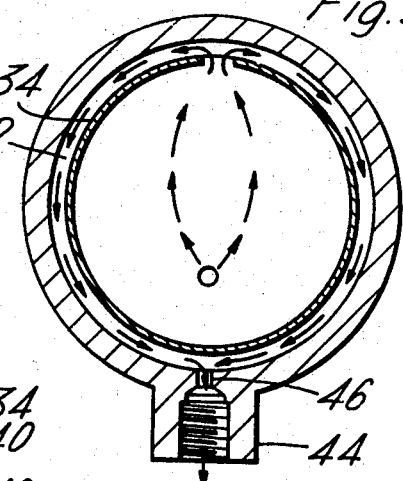

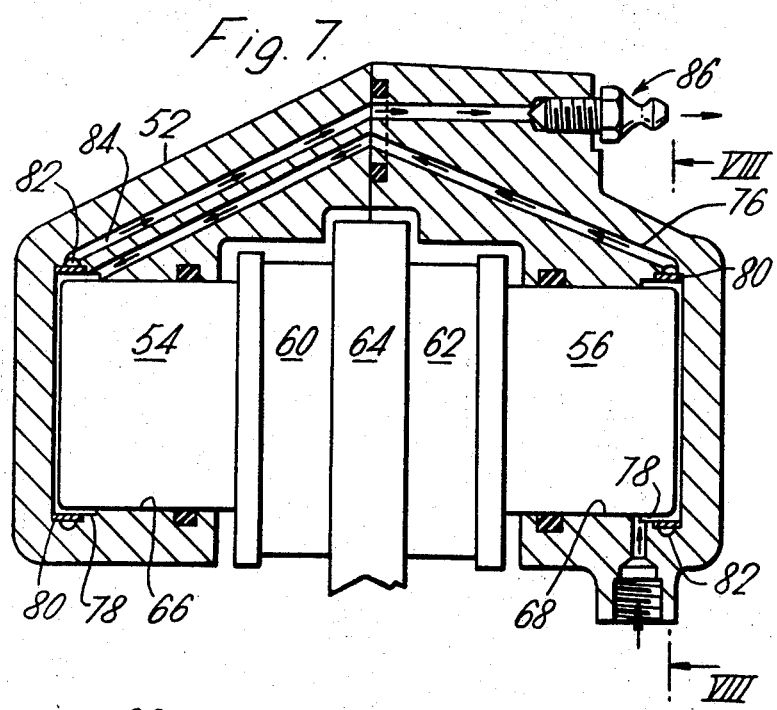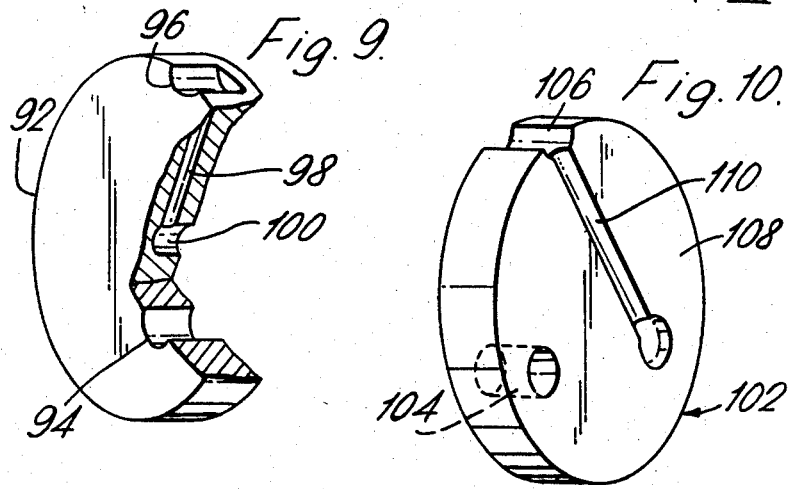

3,545,577

BLEEDING HYDRAULIC SYSTEMS

This invention relates to the bleeding of hydraulic systems such as hydraulic braking systems for vehicles. In particular it relates to the provision of bleed outlets for the operating cylinders of a vehicle braking system. The invention is of particular application to operating cylinders in caliper disc brakes and more particularly dual braking in which employing opposed pot calipers.

In order to remove air from a hydraulic system, hydraulic fluid is flushed through the system prior to its being used. This process is known as bleeding the system.

In those parts of a system in which the fluid flow is rapid as in narrow bore connecting tubes, the position of the fluid outlet for the bleeding operation is not critical. However in those parts of a system in which the fluid flow is not rapid such as in the operating cylinders, any air that is present will tend to collect at the vertically highest region of that part of the system and can only be expelled by providing a bleed outlet which communicates directly with that region.

This is not always convenient since the location or angular position of the operating cylinders of a system can cause an inaccessible region of that part to occupy the highest point and in consequence such systems are difficult to bleed.

It is therefore an object of the present invention to provide bleed outlets for inaccessible or inconveniently positioned high points in the operating cylinders of a hydraulic braking system. According to the present invention in an operating cylinder for a hydraulic braking system in which a bleed outlet is provided in the cylinder which when the cylinder is mounted for operation lies below at least part of the working space within the cylinder, passage means is provided for conveying fluid from the cylinder to the bleed outlet, said passage means communicating only between the bleed outlet and the part of the working space thereabove.

The passage may be formed in the cylinder body entirely by providing a bore in the body between the bleed outlet and an aperture in the cylinder wall in said part of the working space above the bleed outlet.

Alternatively the passage may in part be formed by an insert such as a plate or ring located within the cylinder at the end thereof to which hydraulic fluid under pressure is supplied during operation. The plate or ring may be deformed or cut away to cooperate with the cylinder wall to define a passage between the deformed or cut away area of the plate or ring and the cylinder wall.

Alternatively the plate or ring may merely serve as a cover for a groove formed in the cylinder wall, the groove forming a passage when covered by the plate or ring.

As a further alternative the passage may be formed wholly within the plate or ring. This latter arrangement lends itself to the use of a cast or moulded insert, the holes in the insert being formed during the moulding or casting process so that no machining or drilling operations are required.

The insert may be of metal or plastics material.

According therefore to another aspect of the invention there is provided an insert for fitting within the working space of a hydraulic operating cylinder having a bleed outlet which lies below at least a part of said working space when the cylinder is mounted for operation, said insert having formed therein fluid passage means and being adapted for fitting within a cylinder so that one end of the passage means registers with said part of the working space above the bleed outlet and the other end registers with the bleed outlet.

The invention also provides a caliper disc brake employing operating cylinder according to the invention.

The invention will now be described by way of example with reference to the accompanying drawings, in which:

FIG. 1. is a perspective view of a dished circular plate insert for forming an annular chamber at the end of a hydraulic operating cylinder;

FIG. 2 is a view of the end of an operating cylinder with the plate of FIG. 1 in position;

FIG. 3 is an axial cross section on the line A-A of the cylinder of FIG. 2 with the piston in place;

FIG. 4 is a perspective view of another insert comprising a discontinuous ring for fitting in a hydraulic operating cylinder for forming with an annular groove in the cylinder wall, adjacent one end thereof, an annular chamber;

FIG. 5 is a view of one end of the cylinder with the ring of FIG. 4 in position;

FIG. 6 is an axial cross section on the line A-A of the cylinder of FIG. 5 with the piston in place;

FIG. 7 is a cross section on the line A-A of FIG. 8, of a dual system disc brake caliper in which each operating cylinder includes a ring as illustrated in FIGS. 4 to 6 to define an annular chamber therewithin;

FIG. 8 is a cross section on the line C-C of FIG. 7 and includes a scrap section on the line D-D of FIG. 7;

FIG. 9 is a perspective view (partly broken away) of a further insert comprising a solid disc for fitting at one end of the operating cylinder in which a channel is formed by a bore within the thickness of the disc; and FIG. 10 is a perspective view (partly broken away) of a still further insert comprising a solid disc for fitting at one end of an operating cylinder in which a channel is formed by a groove in the surface of the disc.

The insert shown in FIG. 1 comprises a circular plate 10 the edge of which is stepped to form a peripheral flange orificed axially displaced from the plane of the central region of the plate over the major portion of the periphery of the plate. The stepped deformation is discontinued at 14 so that, as best seen in FIG. 2, when fitted within an operating cylinder 20 the plate does not interfere with a fluid inlet port 16. The flange 12 is cut away at 18.

Referring to FIGS. 2 and 3 the plate 10 is fitted within the cylinder 20 with the flange against the end wall of the cylinder 22. A piston 21 is fitted within the cylinder. The plate is dimensioned to be a tight fit within the cylinder so that the stepped periphery of the plate 10 forms with the end wall 22 an annular chamber 24. As shown in FIG. 2 the plate is positioned so that the undeformed portion 14 registers with the fluid inlet port 16 and the cut away 18 registers with the upper region of the cylinder cross section.

An outlet port 26 which communicates with a bleed outlet 28 is 21—by the flange 12 so that, as shown by the arrows, fluid from the working space in the cylinder can only enter the outlet 28 by passing through the cut away 18 and around the annular chamber 24.

In the arrangement illustrated in FIGS. 4 to 6, the insert comprises a ring 30 having a break or discontinuity 32. This type of insert is to be preferred in a cylinder in which the axial space is limited. As shown in FIG. 6 the ring 30 is arranged as a snap fit in an annular recess 34 formed in the cylindrical wall of a cylinder 36 within which is fitted a piston 38. The recess 34 allows the full length of the cylinder 36 to be used, right up to the end wall 40.

The recess 34 is itself formed with an annular groove 42. When in position, the ring 30 bridges the groove 42 and forms an enclosed chamber which communicates with the cylinder 36 by means of the discontinuity 32 in the ring.

A bleed outlet 44 communicates with the groove 42 by means of a passage 46.

Fluid is supplied to the cylinder 36 through inlet port 48 which communicates with the cylinder through an aperture in the end wall 40.

The ring 30 is positioned in the cylinder with the discontinuity 32 registering with the upper region of the cylinder cross section. The path taken by fluid during a bleeding operation is shown by the arrows in FIG. 5. From this FIG. it will be seen that the fluid is forced to pass through the discontinuity 32 into the groove 42 before it can escape through the bleed outlet 48 thereby carrying air with it.

As shown in dotted outline in FIG. 4, the ring may be provided with a tag 50 by which the ring can be located within the cylinder. To this end a suitable hole or recess is formed in the cylinder wall to receive the tag, which thereby prevents the ring from rotating so that the discontinuity no longer registers with the upper region of the cylinder cross section.

In FIGS. 7 and 8 the invention is shown applied to a disc brake caliper for a hydraulic braking system of the type employing two independent hydraulic circuits. In one such system the caliper includes two pair of opposed piston and cylinder assemblies which are supplied with hydraulic fluid separately but act on a single pair of friction pad assemblies. Such an arrangement is shown generally in FIGS. 7 and 8 where the caliper is generally designated 52, the opposed pair of pistons cut by the line A–A and shown in FIG. 7 being designated 54, 56 and the one piston of the second pair which is visible in FIG. 8 being designated 58. The two pairs of pistons act on a pair of friction elements 60, 62 between which is located the braking disc 64. The pistons 54, 56 are fitted in cylinders 66, 68 respectively while the piston 58 is fitted in a cylinder 70.

Hydraulic fluid is supplied to the cylinder 68 and 70 through separate fluid inlets 72, 74 respectively. As shown in FIG. 7 fluid is supplied from cylinder 68 to the opposite cylinder 66 through a passage 76 in the caliper 52, the direction of flow from cylinder 68 to 66 being shown by arrows. A similar working passage (not shown) connects the two cylinders in the other pair. A stepped annular recess 78 is formed at the closed end of each cylinder and a ring 80 (corresponding to the ring 30 of FIGS. 4 to 6) is accommodated as a snap fit within the larger diameter stepped portion of the recess 78. This portion also includes an annular groove 82 which is covered by the ring 80. To prevent the pistons 54, 56 etc. from covering the fluid inlet and transfer passage openings in the cylinder wall, these passages terminate in the stepped portion of smaller diameter, of each annular recess 78.

The annular groove 82 associated with the cylinder 66 communicates with a passage 84 in the caliper which terminates in a bleed outlet 86 for the opposed piston/cylinder pair 54, 66/56, 68. A similar passage (not shown) communicates with the corresponding cylinder of the other pair (not shown) and terminate in a second bleed outlet 88 for the other piston/cylinder pair.

The caliper shown is designed for operation with the left-hand end of the caliper (as depicted in FIG. 8) lower than right-hand end. In consequence air will tend to collect on the right-hand side of each cylinder (as depicted in FIG. 8) since these regions will correspond to the high points for each separate operating cylinder assembly. Each ring 80 is thus fitted within its recess with its discontinuity adjacent the high point for that particular cylinder, as shown in FIG. 8. The direction of flow of fluid supplied to each of the cylinders 68 and 70 during bleeding is depicted by arrows in FIG. 8.

In FIG. 9 there is shown an alternative insert 92 which may be used for example in place of the ring 30 of FIGS. 4 to 6. Due to the thickness of this alternative insert it can only be used where there is adequate axial space available. The insert is a solid disc which is a tight fit in the end of the cylinder 36 (FIG. 6). An axially parallel passage 94 permits fluid to flow from the fluid inlet 48 (FIG. 6) into the cylinder. The periphery of the disc is cut away to form a depression 96 and a radial passage 98 communicates with the depression 96 and a central blind bore 100 which opens on the face of the disc abutting the end wall of the cylinder. A bleed outlet (not shown) is provided at the centre of this end of the cylinder which thereby registers with the bore 100. The position of the depression is selected to correspond to the high part of the cylinder section when the cylinder is in its operating position.

In FIG. 10 there is shown an alternative solid disc insert 102 which is also a tight fit in the cylinder 36 (FIG. 6). The disc includes a passage 104 to supply fluid from the fluid inlet 48 to the cylinder. The edge of the disc is cut away over the entire thickness of the disc at 106 and a groove 110 is formed in the face of the disc 108 which abuts the closed end of the cylinder. The groove 110 cooperates with the end wall of the cylinder to form a channel which communicates with a bleed outlet (not shown) in the end wall.

The disc of FIG. 9 or 10 may be moulded from a suitable plastics or synthetic resin material or cast from a suitable metal or metal alloy.

I claim:

1. A fixed caliper disc brake having independent pairs of operating cylinders for connection to dual circuits each pair having a feed and a bleed connection to one of the cylinders, and which is mountable so that at least part of the working space of at least one of the cylinders lies above the bleed outlet therefor, passage means lying at least in part within the working space within the cylinder and communicating with said bleed outlet, and a member within said working space separating the latter from said passage means, said member including port means for communicating said working space with said passage means, said member being positionable within said working space such that said port means is disposed in the substantially vertically highest region of the working space above the bleed outlet when said caliper is fixed in its position of use so as to convey fluid from said region within said working space through said passage means to said bleed outlet.

2. A fixed caliper disc brake as set forth in claim 1 wherein the part of said passage means within said working space is defined by an annular groove formed in the cylinder wall and said member comprises an insert covering said groove, the insert being cut away at its substantially vertically highest point to provide said port means permitting fluid to flow into the passage formed between the groove and cover from the substantially vertically highest region of the working space above the bleed outlet and the remainder of said passage means in the caliper body communicating said groove with said bleed outlet.

3. A fixed caliper disc brake as set forth in claim 1. wherein said passage means is formed in part by said member the latter comprising a circular plate insert located within the cylinder at the end thereof to which hydraulic fluid under pressure is supplied to effect operation of the cylinder and in which the insert is deformed or cutaway to form an annular recess which cooperates with the cylinder end wall to define a passage between the cylinder end wall and the recess in the insert, and the bleed outlet communicating with an aperture in the cylinder end wall which registers with the recess in the insert, the insert being further deformed or cutaway to define said port means between the recess and the substantially vertically highest region of the working space above the bleed outlet.